(No Model.)
J. PAYNE.
ARTIFICIAL TOOTH.
No. 461,844. Patented Oct. 27, 1891.
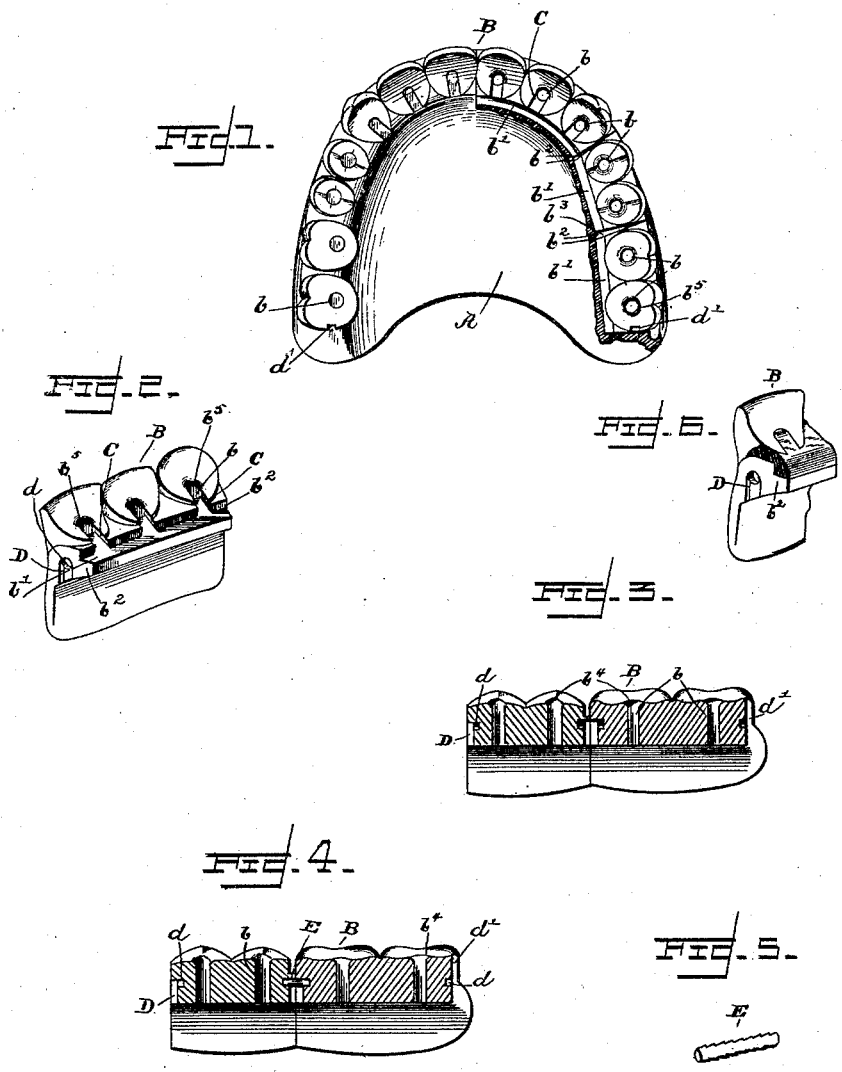
Witnesses
E. S. Duvall Jr.
H. P. Wolhaupter
Inventor
Joseph Payne.
By his Attorneys,
C. A. Snow & Co.

UNITED STATES PATENT OFFICE.

JOSEPH PAYNE, OF DWIGHT, ILLINOIS.

ARTIFICIAL TOOTH.

SPECIFICATION forming part of Letters Patent No. 461,844, dated October 27, 1891.

Application filed March 18, 1891. Serial No. 385,533. (No model.)

*To all whom it may concern:*

Be it known that I, JOSEPH PAYNE, a citizen of the United States, residing at Dwight, in the county of Livingston and State of Illinois, have invented a new and useful Improvement in Teeth, of which the following is a specification.

My invention relates to artificial teeth of that class that are secured to their plates without the use of pins; and it has for its objects to provide, primarily, a connection between the teeth and their plates, whereby it will be almost an impossibility for the separation of the teeth therefrom, and to provide such a connection between the teeth and the plate that the strain will be taken off of the plate and thus render the same less liable to breakage, while at the same time a certain amount of elasticity is allowed; and it consists of certain details of construction hereinafter more fully described, illustrated in the accompanying drawings, and specifically pointed out in the appended claims.

In the accompanying drawings, Figure 1 is a plan view of a full set of upper teeth mounted upon its plate, one-half of which shows the teeth upon the plate preparatory to their molding thereon. Fig. 2 is a rear perspective of a block of front incisors. Fig. 3 is a longitudinal sectional view taken through two rear blocks of teeth. Fig. 4 is a similar view showing a pin connecting the two ends of the teeth-sections. Fig. 5 is a detail view of the pin; and Fig. 6 is a detail perspective view of one tooth, showing the molding therein.

Like letters of reference indicate like parts in the several figures.

A denotes the plate, constructed of rubber, celluloid, or other suitable material. The teeth B may be mounted upon the plate either singly or in blocks, which latter is preferred, and are provided with perforations $b$ extending therethrough. Each block of teeth or each tooth is further provided on the inner side with a recessed portion or shouldered ledge $b'$, that is adapted to connect continuously with the recessed portion of the adjacent teeth, whereby the teeth may be connected firmly together when the rubber plate is molded thereto. The teeth are beveled on their sides, as at $b^2$, so that when they are placed together there will be formed a wedge-shaped opening $b^3$ between the same, and thus place the pressure both upon the teeth and the denture equally. The set of front incisors are further provided with a dovetail groove C, that is designed to connect the perforations through the tooth and the recessed portion in the rear of the same, thus providing a connection between the material of which the plate is composed in the perforation and the main body of the plate, thereby firmly securing the teeth to the plate. Each block of teeth on their meeting sides have dovetail grooves D, at the upper end of which and at right angles thereto is located a recess $d$, into which and into the groove D the rubber of the plate seats itself firmly and connects the teeth to each other. The groove D on the farthermost side of the last block of teeth is extended up to the full length of a tooth, as shown at $d'$. The perforations $b$ in all the blocks of teeth are countersunk on the upper faces of the same, the countersinks of the rear teeth being from both sides of the tooth, as shown at $b^5$, while the front blocks of teeth are countersunk from one side only, as shown at $b^4$, in order to connect evenly with the groove C therein.

It is now thought that the connection between the teeth and the plate will now be apparent; but, in addition to what has already been described, I propose to use a roughened pin E, that is adapted to connect the ends of the teeth together, being molded in with the rubber in the right-angularly disposed recesses $d$, which are situated at the upper end of the side grooves D, giving further support to the teeth and rendering the same less likely to be broken from the plate. It can be readily seen that the rubber of the plate passes up through the perforations of the teeth in lieu of the pin ordinarily used, and thus principally form the connecting medium between the teeth and the plate, while the other details of construction give additional rigidity to the connection. As said, in the front set of teeth the rubber in the perforations connects with the main body of the plate by passing through the grooves which connect the perforations and the recessed portion at the rear of the tooth, into which recessed portion the rubber also finds purchase for holding the teeth to the plate. The wedge-shaped opening converges from the inner face of the teeth to a fine point on the outer face, and thereby prevents the rubber being exposed to view and marring the symmetry of the teeth. The said wedge-shaped opening, the recessed portion at the rear of the teeth, the grooves at the meeting ends of the teeth, and the right-angularly-disposed recess at the upper terminals of said lateral grooves are continuously connected to the plate, inasmuch as the material of which the plate is composed has an unbroken connection between all the parts just specified. The upward extension of the lateral grooves at the extreme end of the set of teeth of course permits the material to become flush with the grinding-surfaces thereof and gives a firmer connection between the same and the plate, while all the grooves in all the teeth being dovetailed complete a construction which renders it almost a physical impossibility to separate the teeth from the material upon which they are molded.

Having thus described my invention, what I claim, and desire to secure by Letters Patent, is—

1. In a set of artificial teeth, the teeth, a perforation extending through the entire length of each tooth, a recessed portion or shouldered ledge at the rear sides of the same, dovetailed grooves connecting the outer ends of said perforations with said recessed portion or ledge, grooves in the meeting sides of each tooth or block of teeth, and a right-angularly-disposed recess located at the upper ends of said grooves, into all of which the material of which the plate is composed is designed to be molded and thus secure the teeth to the plate, substantially as described.

2. In a set of artificial teeth, the teeth beveled on their meeting sides to form a wedge-shaped opening, countersunk perforations extending through the entire length of each tooth, a recessed portion or shouldered ledge at the rear sides of the same, dovetail grooves connecting the outer ends of said perforations and said recessed portion or ledge, dovetail grooves in the meeting sides of each tooth or block of teeth, a right-angularly-disposed recess located at the upper ends of said grooves, and a pin entering the right-angularly-disposed recesses in the meeting sides of each tooth or block of teeth, around which and into the grooves, perforations, and recesses of the teeth the material of which the plate is composed is designed to be molded, substantially as set forth.

In testimony that I claim the foregoing as my own I have hereto affixed my signature in presence of two witnesses.

JOSEPH PAYNE.

Witnesses:
L. A. NAFFZIGER,
A. T. DOHERTY.